(12) United States Patent
Schilling et al.

(10) Patent No.: US 8,094,376 B2
(45) Date of Patent: Jan. 10, 2012

(54) MULTI-LAYER BODY WITH MICRO-LENS ARRANGEMENT

(75) Inventors: Andreas Schilling, Hagendorn (CH); Wayne Robert Tompkin, Baden (CH)

(73) Assignee: OVD Kinegram AG, Zug (CH)

( * ) Notice: Subject to any disclaimer, the term of this patent is extended or adjusted under 35 U.S.C. 154(b) by 609 days.

(21) Appl. No.: 12/223,057

(22) PCT Filed: Jan. 16, 2007

(86) PCT No.: PCT/EP2007/000338
§ 371 (c)(1),
(2), (4) Date: Aug. 15, 2008

(87) PCT Pub. No.: WO2007/087984
PCT Pub. Date: Aug. 9, 2007

(65) Prior Publication Data
US 2010/0277805 A1 Nov. 4, 2010

(30) Foreign Application Priority Data
Feb. 1, 2006 (DE) .......................... 10 2006 005 000

(51) Int. Cl.
G02B 27/10 (2006.01)
G03B 21/60 (2006.01)
(52) U.S. Cl. ........................................ 359/619; 359/455
(58) Field of Classification Search .......... 359/618–621, 359/626, 443, 454–455; 264/1.1, 1.32, 2.7
See application file for complete search history.

(56) References Cited

U.S. PATENT DOCUMENTS

| 4,765,656 | A | 8/1988 | Becker et al. |
| 5,351,151 | A | 9/1994 | Levy |
| 6,700,702 | B2 * | 3/2004 | Sales .............................. 359/443 |
| 2002/0012447 | A1 | 1/2002 | Amidror et al. |
| 2002/0027300 | A1 * | 3/2002 | Hartmann et al. ............. 264/1.1 |
| 2005/0057036 | A1 | 3/2005 | Ahlers |
| 2005/0141096 | A1 | 6/2005 | Tomczyk |
| 2007/0058260 | A1 * | 3/2007 | Steenblik et al. ............. 359/626 |

FOREIGN PATENT DOCUMENTS

| CA | 2294755 | 1/1997 |
| DE | 19729918 | 1/1999 |
| DE | 202004019493 | 3/2005 |
| EP | 0698256 | 1/2001 |
| EP | 1238373 | 6/2004 |
| WO | WO 96/22558 | 7/1996 |
| WO | WO 99/23513 | 5/1999 |
| WO | WO 00/25276 | 5/2000 |
| WO | WO 03/052680 | 6/2003 |
| WO | WO 03/061983 | 7/2003 |
| WO | WO 2005/052650 | 6/2005 |
| WO | WO 2005106601 A2 * | 11/2005 |
| WO | WO 2006/063907 | 6/2006 |

* cited by examiner

Primary Examiner — Dawayne Pinkney
(74) Attorney, Agent, or Firm — Hoffmann & Baron, LLP

(57) ABSTRACT

Described is a multi-layer body for viewing from the front and rear sides in transillumination mode, wherein the multi-layer body (1) comprises one or more transparent first layers (10) and a second layer (14) with a micro-pattern comprising opaque first partial regions and transparent second partial regions. One of the first layers (10) on its surface remote from the second layer (14) has a surface profile forming an arrangement of a plurality of first micro-lenses (12). The thickness of that first layer (1) or that first layer (1) and arranged between that first layer (1) and the second layer (14) one or more further first layers (1) approximately corresponds to the focal length of the first micro-lenses.

46 Claims, 8 Drawing Sheets

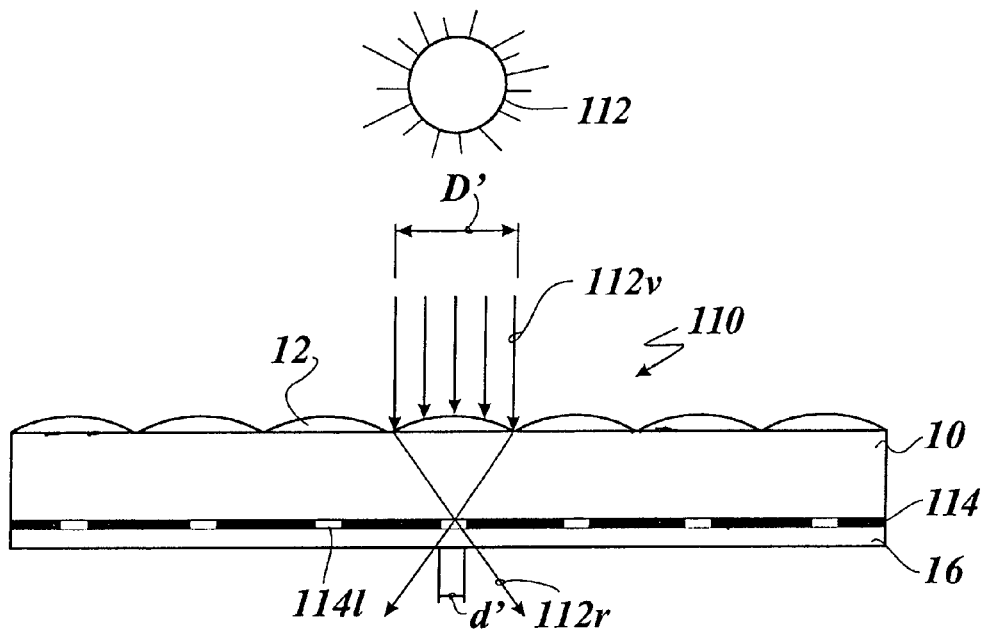
Fig. 11a
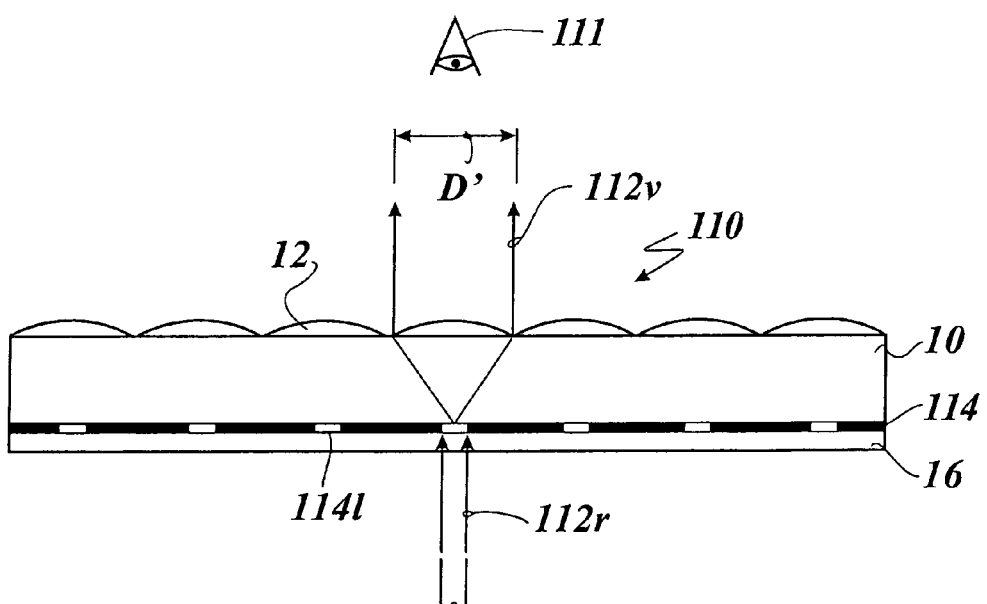
Fig. 11b
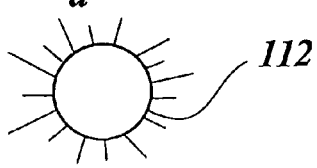

MULTI-LAYER BODY WITH MICRO-LENS ARRANGEMENT

This application claims priority based on an International Application filed under the Patent Cooperation Treaty, PCT/EP2007/000338, filed on Jan. 16, 2007 and German Application No. DE 102006005000.2-51, filed on Feb. 1, 2006.

BACKGROUND OF THE INVENTION

The invention concerns a multi-layer body with a micro-lens arrangement, which can preferably be used as an optical security element.

Optical security elements are used in window banknotes, ID cards, passports and similar security documents in order to be able to check the authenticity of those documents using simple means and to make it more difficult to forge those documents.

Solutions for optical security elements which provide micro-lenses for producing optical effects are known.

WO 03/061983 A1 describes an optical security element having a surface structure which has a plurality of micro-optical structures arranged in a specific pattern. The micro-optical structures are for example cylindrical lenses which co-operate with light-collecting structures and thus assemble micro-images arranged over a surface in the eye of a viewing person to provide a stereo image.

EP 0 698 256 B2 describes an optical security element which has a regular two-dimensional arrangement consisting of spherical micro-lenses, which is arranged over a regular arrangement of substantially identical printed micro-images, the size and the number of the images which can be perceived depending on how precisely the micro-images and micro-lenses are oriented relative to each other. In the case of exact orientation, it is possible to perceive an image of maximum size, while with increasing deviation the number of images increases and the image size decreases. Design configurations for example provide for the production of stereo images.

US No 2002/0012447 A1 describes a process and an apparatus in which inter alia micro-lens arrangements laid over geometrical structures produce characteristic moiré patterns. It is provided that the moiré patterns produced in that way are used for authenticity checking, by carrying out a comparison with a reference pattern.

EP 1 238 373 B1 describes a process and an apparatus for producing a characteristic moiré intensity profile by the superpositioning of a master screen and a basic screen. The master screen can be a micro-lens arrangement. It is provided that authenticity checking is effected by comparing the moiré intensity profile with a pre-stored moiré intensity profile.

SUMMARY OF THE INVENTION

Now the object of the invention is to provide a multi-layer body which can be used as an optical security element which is inexpensive to produce and exhibits optical effects which are easily recognisable for anyone and at the same time baffling or surprising and therefore easily remembered.

The object of the invention is attained with a multi-layer body for viewing from the front and rear side in transillumination and/or incident illumination, wherein it is provided that the multi-layer body has one or more transparent first layers and a second layer which has a plurality of micro-patterns comprising one or more opaque first partial regions and one or more transparent second partial regions, one of the first layers on its surface remote from the second layer has a surface profile which forms an arrangement of a plurality of first micro-lenses, and the thickness of said first layer or said first layer and one or more further first layers arranged between said first layer and the second layer approximately corresponds to the focal length of the first micro-lenses.

The multi-layer body according to the invention therefore has first partial regions in which at least the second layer is opaque; and it has second partial regions in which all layers of the multi-layer body are transparent. In the region of the second partial regions, the multi-layer body is transparent throughout, that is to say the layers of the multi-layer body are transparent in the region of the second partial regions.

When viewed from the front side and from the rear side, such a multi-layer body produces very different optical effects which form a security feature that is difficult to copy. The micro-lenses which are formed in one of the first layers form an optical imaging system which is suitable for enlarging the micro-patterns. A respective pixel of the micro-pattern for each micro-lens is selected by the micro-lenses. By virtue of the micro-lenses that takes place with a very high level of light intensity, but in principle a shadow mask would also function. The micro-pattern comprises first partial regions which are opaque to the human viewer or the human eye, that is to say they appear light-impervious (due to absorption or reflection of the incident light), and second partial regions which are transparent to the human viewer or the human eye, that is to say they appear to be light-transmitting. The overall impression produced in that way exhibits transparent image regions which change their position in dependence on the viewing direction so that it can seem that a transparent image region is floating in front of an opaque background. Images can apparently appear behind the surface of the multi-layer body or in front of or in the surface thereof, in dependence on whether the screen raster width of the micro-lenses is less than or greater than the screen raster width of the micro-images. If the two raster widths are exactly the same, but are turned somewhat relative to each other, the interesting effect is to be observed, that images appear to move from left to right when the multi-layer body is moved somewhat backwards and forwards, and images appear to move forwards and backwards when the multi-layer body is moved towards the left and the right.

It is further possible for images to be represented in side-reversed or rotated relationship, that is to say the images can be magnified versions of the micro-patterns (magnification>1) or the images can be side-reversed or rotated versions of the micro-patterns (magnification<−1).

When viewing from the rear side in contrast the multi-layer body appears as an opaque surface which for example can show information in the manner of a grey scale image. That apparent contradiction between the two optical impressions manifests itself both in incident illumination and also in transillumination and is very striking and easily remembered.

Inevitable manufacturing tolerances in respect of the radius of the micro-lenses, the refractive index and the thickness of the micro-lens layer do not adversely affect the operability of the multi-layer body according to the invention. As experiments have shown, the thickness of the micro-lens layer can differ from the desired reference value by between 10% and 20% of the focal length.

Advantageous configurations of the invention are set forth in the appendant claims.

It can be provided that the transparent second partial regions form an image representation and the opaque first partial regions form a background region from which the image representation stands out. That affords further attractive effects. For example there can be the impression of looking through a keyhole and in that case viewing on to a brightly shining surface. That keyhole effect is unexpected because the viewing person is looking on to a surface which is apparently opaque throughout, when he selects a different viewing angle or views the multi-layer body from the other side.

It can further be provided that the surface proportion of the opaque first partial regions in relation to the total surface area of the first and second partial regions is 20% to 60%. In that region the above-described effect is particularly significantly pronounced. The greater the surface proportion of the opaque partial regions in relation to the total surface area, the correspondingly smaller are the transparent image regions forming the keyhole effect, and vice-versa.

It can be provided that the image representation is a geometrical figure, one or more alpha-numeric characters or a logo. If the multi-layer body according to the invention is used as a security element in a banknote provided with a window, the micro-pattern can be a currency symbol, for example a Euro or a dollar sign. Further interesting optical effects can be produced by the combination of the above-mentioned configurations of the micro-patterns with the background region. Thus for example an alpha-numeric character can be represented against a holographic background, that is to say the first opaque partial region can be in the form of a hologram or KINEGRAM®. By way of example, a holographic background region can appear perforated by the above-mentioned Euro or dollar sign, which again deflect the view on to a transparent light surface, like a keyhole. In that case, the Euro or dollar sign can apparently travel over the hologram, upon a change in the viewing direction. The hologram or KINEGRAM® can be somewhat limited in terms of its quality by the micro-lenses, in which case the micro-lenses do not have a magnifying effect for the hologram or KINEGRAM®.

It can be provided that the micro-lenses are of a diameter of 5 µm to 500 µm.

It can further be provided that the diameter of the micro-lenses is less than 50 µm.

The micro-lenses can be formed e.g. by hot embossing or stamping in a thermoplastic film or by embossing and hardening a UV hardenable layer. Those production processes are known from the production of multi-layer transfer films. The micro-lenses can also be produced by intaglio printing, in which case under some circumstances a loss in brightness can occur as a consequence of total refraction at the interface for large image angles, due to differing refractive indices of the micro-lenses and the carrier material. The micro-lenses can also be formed by fusing on surface regions which have been separated off, wherein the fused-on surface regions assume a spherical shape, as a result of surface tension. It is also possible to shape aspheric lenses which can have considerable advantages in regard to depth of focus and imaging angle. Aspheric lenses can be produced with the so-called reflow method in combination with reactive ion etching or grey scale technologies (for example HEBS glass or production with electron beam). It is further possible for the micro-lenses to be implemented in the form of diffractive micro-lenses (in relation to air or embedded in further material layers), diffractive lenses (that is to say as a corresponding embossing or volume hologram) or in the form of a gradient index in an optically transparent layer.

An advantageous configuration provides that the micro-patterns form pixels of a grey scale image, wherein the dimensions of the pixels are <300 µm. The grey scale image is an image whose pixels differ by their grey value.

The grey value can be interpreted generally as the brightness value of a colour surface. The base colour of a grey scale image therefore does not have to be grey. A grey scale image can also be coloured as is known for example from sepia-toned black-and-white photographs. The colour of the grey scale image can also be determined by the colour of the material provided for making up the micro-patterns, for example when using gold the grey scale image can appear to be of a gold colour while when using a printing ink it can be of the colour shade thereof. It can further be provided that the micro-pattern is made up of two layers which produce a different colour impression so that a different colour impression is produced when viewing the front side from when viewing the rear side. It can also be provided that one of the layers is applied over the full surface area and is transparent for a restricted spectral range. The pixels can also be pixels which irridesce in different colours. As described hereinbefore the micro-patterns can be of different grey values which form a grey shade scale.

It can be provided that micro-patterns have a different grey value by the opacity of the first partial regions and/or the transparency of the second partial regions being varied. Accordingly the pixels have a different reflection capability (when viewing in incident illumination) or different opacity (when viewing in the transillumination mode). Opacity is a measurement in respect of light-imperviousness of substances. The opposite to opacity is transparency which is a measurement in respect of light-perviousness of substances. Opacity and transparency are to be attributed to optical density or extinction which is a measurement in respect of the attenuation of radiation, for example light, in a medium. The proportion of the radiation which is transmitted is referred to as the transmission ratio. Optical density is the negative common logarithm of the transmission ratio. Division into opaque first partial regions and transparent second partial regions is such, in relation to this embodiment of the invention, that the opaque first partial regions are markedly less transparent than the transparent second partial regions and opaque and transparent partial regions can be recognised as such in particular by a human observer and can be clearly distinguished from each other.

Due to the pixel-wise magnification of the pixels of the micro-patterns, which has been described hereinbefore, the enlarged micro-pattern appears generally with a homogeneous grey value in spite of a variation in the grey value of the micro-patterns. It is however also possible for the grey scale image which is visible from the rear side of the multi-layer body according to the invention to be such that, when viewing the magnified image which is visible from the front side of the multi-layer body, a further interesting optical effect is produced, for example the magnified image representation has a transparency variation and/or the opaque background region has an opacity variation. It is therefore possible to provide pixels with different grey values for a grey scale image which is visible from the side of the second layer, that is remote from the micro-lenses.

The naked eye is not capable of recognising the above-described pixels of the dimensions <300 µm as a micro-pattern. It even cannot resolve the pixels formed from micro-patterns, as separate pixels, so that it perceives the grey scale image only in its entirety.

A further advantageous configuration provides that the micro-lenses and the micro-patterns have a repetitive arrangement. The raster may be a grating-form raster with orthogonal boundary lines. It may however also be another raster, for example a hexagonal raster. The raster can also be provided with oblique-angled boundary lines or it can be turned through an angle relative to the boundary edges of the multi-layer body.

It can be provided that the micro-lenses and the micro-patterns are respectively arranged in a two-dimensional raster, wherein the raster width is in particular 20 µm to 50 µm.

It can further be provided that the rasters of the micro-lenses and the micro-patterns coincide. The micro-lens rasters and the micro-pattern rasters can also be turned relative to each other (possibly very little, such as for example a few tenths of a degree), in particular for the situation where the raster widths are identical.

Alternatively it can be provided that the rasters of the micro-lenses and the micro-patterns are different. It is possible in that way for example to produce a moiré effect which can be a characteristic optical feature.

In a further configuration it is provided that the raster width of the micro-lenses and/or the micro-patterns is constant. With a constant raster width $\Delta x(x,y)$ and $\Delta y(x,y)$ are constant (x,y: co-ordinate axes of the plane defined by the surface of the multi-layer body; $\Delta x$, $\Delta y$: spacing of the micro-patterns from each other in the x- and y-directions). It can be provided that the micro-lens array and the micro-pattern array have identical rasters which however are turned relative to each other.

It can however also be provided that the raster width of the micro-lenses and/or the micro-patterns is variable. The raster width can then be dependent on the co-ordinates of a point, that is to say $$\Delta x = \Delta x(x,y)$$

and $$\Delta y = \Delta y(x,y).$$

A variable raster width can for example trigger the moiré effect referred to hereinbefore, but it can also be used to associate the pixels of the micro-patterns with the micro-lenses and thus to exert a creative influence on the configuration of the magnified micro-pattern or micro-patterns. The raster width can vary for example because of an especially defined mathematical function.

It can further be provided that the rasters of the micro-lenses and the micro-patterns are displaced relative to each other.

The micro-patterns themselves can also change, for example a plurality of micro-patterns can be arranged in partial rasters. It is possible in that way for example to provide a spiral-shaped arrangement.

A plurality of different micro-patterns can be disposed in an orderly arrangement, whereby for example a stereo or pseudo-stereo effect can be produced. It can also be provided that, with different viewing angles, different magnified micro-patterns are represented, whereby for example a motion effect or a morphing effect can be generated.

In a further advantageous configuration it is provided that the micro-lenses and the micro-patterns are arranged in register relationship. The arrangement in register relationship is admittedly not necessary for producing the above-described optical effects, but nonetheless particularly well-reproducible results are achieved in that way. Imitations which are produced for example by joining separately produced micro-lens arrays and micro-pattern arrays in mutually superposed relationship can be produced in uniform quality, only with a high level of complication and expenditure. The arrangement in register relationship can also be provided for non-repetitive rasters, for example for deformed, transformed or distorted rasters.

A further advantageous configuration provides that the micro-patterns of the second layer are respectively formed by a transparent second partial region which is in the form of a micro-hole and by an opaque first partial region of the second layer, which completely surrounds the second partial region.

It is further provided that the micro-lenses and the micro-holes have a repetitive arrangement.

It is advantageously provided that the micro-lenses and the micro-holes are respectively arranged in a two-dimensional raster. Preferably the two rasters coincide so that a micro-lens is associated with each micro-hole. The micro-holes can admittedly be formed with any desired contour, but nonetheless the circular hole contour corresponding to the micro-lens shape is preferred.

It can further be provided that the micro-lenses and the micro-holes are arranged in register relationship, the focal points of the micro-lenses corresponding to the centre points of the micro-holes. In that way therefore precisely one micro-lens is arranged over a micro-hole, the micro-hole being disposed in the focal plane of the micro-lens.

It is further provided that the diameter of the micro-lens is larger than the diameter of the micro-hole. In that way the multi-layer body according to the invention is in the form of a directionally dependent filter. If a light source is arranged in front of the rear side of the multi-layer body, the micro-holes act as light stops which allow the passage of only a part of the rays of the light source, which impinge on the multi-layer body. In such an arrangement therefore, the multi-layer body can be used for example a sun protection means. If however a light source is arranged in front of the front side of the multi-layer body, the micro-lenses focus the beams and pass them in concentrated fashion through the micro-holes. In that way, virtually all rays which impinge on the multi-layer body are transmitted, and the rear side of the multi-layer body appears as a transparently lit surface.

It can be provided that the diameter of the micro-hole is 1% to 50% of the diameter of the micro-lens.

The above-described multi-layer body can be for example in the form of the transfer layer of a transfer film which can be applied to window panes or the like. The film can also be applied to slats or bars of a sun-protection device arranged in front of or behind a window, which slats or bars are pivotable through 180° and form a continuous surface in the two limit positions. The sun-protection device can be used in the one position of the slats or bars as highly effective sun protection and in the other position of the slats or bars it can be used as a highly transparent view protection or camouflage. In the 90° intermediate position, it can enable a view through the window pane.

Production of the fine structures of the micro-patterns can be facilitated if it is provided that the second layer in the opaque first partial regions and in the transparent second partial regions has a surface structure with a different depth-to-width ratio. The thickness of the second layer can be adjusted by means of the depth-to-width ratio of the surface structure of the first layer to which the second layer is applied. It can be provided that the second layer is applied with a constant density in relation to surface area, for example by sputtering. In that case the effective thickness of the second layer is reduced in proportion to an increased depth-to-width ratio of the above-mentioned surface structure. The dimensionless depth-to-width ratio, frequently also referred to as the aspect ratio, is a characterising feature in respect of the surface magnification of preferably periodic structures. Such a structure has 'peaks' and 'troughs' in periodic succession. The spacing between a 'peak' and a 'trough' is referred to here as the depth while the spacing between two 'peaks' is referred to as the width. The greater now the depth-to-width ratio, the corresponding steeper are the 'peak sides', and the correspondingly thinner is a metallic layer deposited on the 'peak sides'. That effect is comparable to the settling of snow on sloping roofs.

It is further provided that the first layers and the second layer together are of a thickness of 10 µm to 1000 µm.

A further configuration provides that the first layers and the second layer together are of a thickness of 15 µm to 50 µm. Small layer thicknesses make the multi-layer body particularly suitable for introduction into windows of paper carriers which in that way remain flexible.

In a further advantageous embodiment it is provided that the second layer, on the side remote from the first layer, is provided with one or more transparent third layers which on the surface thereof that is remote from the second layer has a surface profile which forms an arrangement of a plurality of second micro-lenses, and the thickness of said third layer or said third layer and arranged between said third layer and the second layer one or more further third layers approximately corresponds to the focal length of the second micro-lenses. The second lenses are directed towards the rear side of the micro-patterns and can therefore produce a mirror-image magnified image of the micro-patterns.

It can however also be provided that the micro-patterns respectively include first and second micro-patterns, wherein the first and second micro-patterns are arranged in partial rasters which form a raster. In that way the second micro-lenses produce a magnified image which is not a mirrored image produced by the first micro-lenses.

It can advantageously be provided that the raster is a 50%/50% raster.

In a further configuration it is provided that at least some of the micro-lenses are of a different colour. Because of the small diameter of the micro-lenses, it can be provided that the coloured micro-lenses form a region of such dimensions that it is perceptible with the naked eye.

It can be provided that the micro-lenses form a coloured pattern.

A further attractive optical effect can be achieved if it is provided that mutually oppositely arranged micro-lenses of the first layer and the third layer are complementarily coloured. In that way the transparency of the magnified micro-patterns can be nullified because the two oppositely disposed micro-lenses respectively filter out all colours of light. The effect can also be afforded only for a range of tilting angles for the multi-layer body.

In a further configuration it is provided that the first layer and/or the third layer has micro-lenses of at least two different diameters.

It can be provided that micro-lenses of the same diameter form a region.

It can further be provided that the region which is formed by the micro-lenses of the same diameter is tactily detectable. Supplementing the optical effect afforded by the multi-layer body, by a tactile effect, is an aspect of interest not just in relation to equal opportunities for visually impaired persons. That also further enhances the level of safeguard against forgery of the multi-layer body according to the invention.

It can be provided that micro-lenses of different diameters have a different focal length. If the micro-lenses are lenses of the same configuration, for example hemispherical lenses, then the focal length of the micro-lenses decreases with decreasing diameter. In such a case the micro-lenses of the smaller diameter are arranged in recessed relationship so that the condition referred to hereinbefore is satisfied, namely that the layer thickness is approximately equal to the focal length of the micro-lens. Such a recessed arrangement can facilitate tactile detection.

Alternatively it can be provided that micro-lenses of differing diameters are of the same focal length. For that purpose the micro-lenses of smaller diameter can be in the form of portions of the micro-lenses of larger diameter. With such a configuration the regions can be tactily detected and are optically not or scarcely recognisable.

It can be provided that the micro-lenses are in the form of refractive lenses. It was assumed that that was the case in the description hereinbefore, wherein that conventional configuration is advantageous at least for the tactile effect.

It can also be provided however that the micro-lenses are in the form of diffractive lenses. The production of diffractive lenses of a large numerical aperture however is difficult and linked to an increased level of manufacturing complication and expenditure because of the production of very fine structures.

In a further configuration of the multi-layer body according to the invention it is provided that the micro-lenses are covered with a fourth layer, wherein the difference in refractive index between the fourth layer and the layer in which the micro-lenses are shaped is >0.2.

It can be provided that the fourth layer is a protective layer. Such a layer can protect the micro-lenses from damage or contamination.

It can further be provided that the fourth layer is an adhesive layer. It has already been stated hereinbefore that the multi-layer body can be the transfer layer of a transfer film. The adhesive layer can also be arranged on the outside of the second layer. It can also be provided that the micro-lenses are covered by the protective layer and the adhesive layer is applied on the outside of the second layer. Such an arrangement can be preferred for the use, described hereinbefore, of the multi-layer body as a light-protection means.

As regards the configuration of the second layer, it is possible to implement numerous configurations thereof.

It can be provided that the second layer is a metallic layer or the second layer is a highly refractive dielectric layer or the second layer is a coloured pigment layer or the second layer is a thin film layer or the second layer is a coloured photoresist layer or the second layer is a coloured lacquer layer or the second layer is a thin carbon black-coloured layer. That enumeration by way of example can be enlarged without departing from the scope of the invention insofar as the layers involved are those which permit the formation of the micro-patterns. Thus for example the second layer can also be the surface, remote from the micro-lenses, of the first layer, in which by way of example the micro-patterns are introduced in the form of matt structures. It is therefore only important for micro-patterns which are formed from opaque and transparent regions to be provided in the focal plane of the micro-lenses.

The above-mentioned configurations of the second layer make it possible to produce numerous optical effects which can influence the appearance of the enlarged representations of the micro-patterns and/or the grey scale image. This can also involve optical effects which do not occur in visible light or which are based on the fact that the second layer is capable of converting invisible radiation, for example UV light, into visible light. In particular special coloured pigments are suitable for that purpose.

There is provided an object of value, for example a credit card, banknote, identity card or pass, having a multi-layer body arranged in a window, of the above-described kind.

There is further provided a transparent body, in particular a glass pane, coated with a multi-layer body of the above-described kind.

The use of the multi-layer body according to the invention is however not restricted to those two uses. Besides technical uses as direction-dependent light or radiation protection filters, the multi-layer body according to the invention can be used for example for decoration purposes or for effect lamps.

BRIEF DESCRIPTION OF THE DRAWINGS

The invention is described by way of example hereinafter by means of a number of embodiments with reference to the accompanying drawings in which:

FIG. 4b shows a second variant of a micro-image layer of the multi-layer body of FIG. 1, FIGS. 11a and 11b show diagrammatic sectional views of a sixth embodiment of the multi-layer body according to the invention.

DETAILED DESCRIPTION OF THE INVENTION

Figure 1:
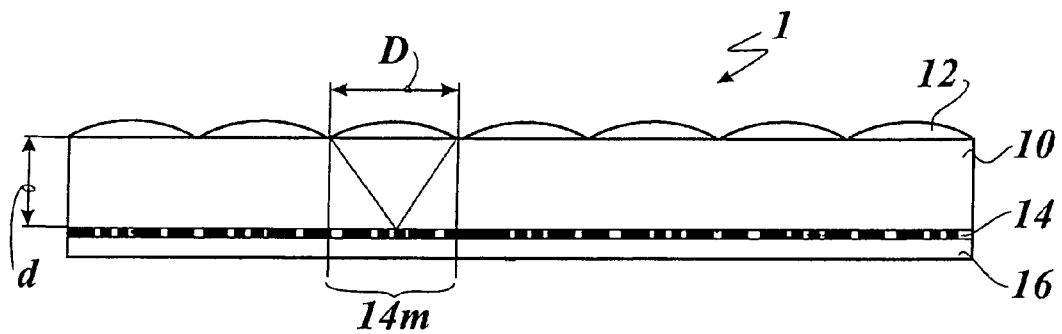
FIG. 1 shows a diagrammatic sectional view of a first embodiment of the multi-layer body according to the invention.

FIG. 1 shows a multi-layer body 1 which is in the form of a film and which has a carrier layer 10, in the top side of which micro-lenses 12 are shaped. The micro-lenses 12 are spherical lenses which are distributed in a regular two-dimensional arrangement on the top side of the carrier layer 10. As can be seen from the embodiment shown in FIG. 1 the micro-lenses 12 are arranged in a densely packed configuration, that is to say adjacent micro-lenses touch each other or are at a spacing which is negligible in relation to their diameter. It will be noted that, with diameters of some 10 μm however, the spacing which is of the order of magnitude of some μm is then no longer negligible.

The diameter D of the micro-lenses 12 is selected to be in the range of 10 μm to 500 μm.

The underside of the carrier layer 10 is provided with a metallic layer 14 which is removed in region-wise manner and which is covered by an adhesive layer 16.

Micro-patterns 14m are shaped into the metallic layer 14, a micro-lens being associated with each micro-pattern 14m. The micro-patterns 14m are formed from regions in which the metallic layer 14 is present and regions in which the metallic layer is removed. The regions provided with the metallic layer appear as opaque partial regions and the regions in which the metallic layer is removed appear as transparent partial regions. The transparent partial regions form a pictorial or image representation, for example a geometrical figure and/or one or more alpha-numeric characters and/or a logo and/or a partial region of a hologram or a KINEGRAM®. The opaque partial regions form a background, against which the image representation stands out. The surface area proportion of the opaque first partial regions relative to the total surface area of the first and second partial regions can be between 20% and 60%.

It is preferably provided that the magnified image, projected by the micro-lens 12, of the micro-pattern or of the imaged partial region of the micro-pattern, is at infinity, that is to say it can be viewed by a non-accommodating eye. For that purpose the micro-pattern 14m must be in the focal plane of the micro-lens 12. Therefore the thickness d of the carrier layer 10 is so selected that it is approximately equal to the focal length of the micro-lens 12.

For a lens in respect of which the image distance is infinite, the relationship between the focal length f, refractive index n and radius of curvature r is as follows:

$$f=r/(n-1)$$

By a variation in the radius of curvature r of the micro-lens 12 and the refractive index n of the carrier layer 10, the person developing the above-described multi-layer body 1 is afforded the possibility of well adapting the dimensions of the micro-lenses to the given conditions of use.

The optically effective thickness d of the carrier layer 10, measured from the planar side of the micro-lenses to the underside of the carrier film 10 (see FIG. 1), can be in the range of 10 μm to 1000 μm. For window banknotes or the like a range of 15 μm to 50 μm can be preferred. Depending on the respective configuration of the micro-lenses the total thickness of the carrier layer can be greater than the optically effective thickness d, by the amount of the lens thickness.

The carrier layer 10 can be formed from a PET film, a PEN film or the like, or a similar thermoplastic material, in which the micro-lenses are embossed by thermal shaping. The layer however may also involve a PET film which is coated with a UV-hardenable lacquer or it may be a UV-hardenable lacquer layer which is hardened after the shaping operation.

Particularly simple orientation of the micro-patterns 14m in register relationship can be achieved if the metallic layer 14 is produced of such a thickness that a photoresist layer applied to the metallic layer 14 can be exposed through the metallic layer, in which case imaging of the micro-patterns 14m takes place through the micro-lenses 12.

It can however also be provided that the carrier layer 10 is provided on its underside with a surface structure which, in dependence on the depth-to-width ratio of the surface structure, in the metallic layer 14 applied thereafter by sputtering or the like, forms regions of differing transparency, that is to say of differing thickness. In that way the metallic layer 14 can be used at the same time as an exposure mask for the photoresist.

The dimensionless depth-to-width ratio, frequently also referred to as the aspect ratio, is a characterising feature for the surface magnification of preferably periodic structures. Such a structure forms 'peaks' and 'troughs' in a periodic succession. Here the spacing between a 'peak' and a 'trough' is referred to as the depth while the spacing between two 'peaks' is referred to as the width. The higher now that the depth-to-width ratio is, the correspondingly steeper are the 'peak sides' and the correspondingly thinner is a metallic layer which is deposited on the 'peak sides'. That effect is also to be observed when the arrangement involves discreetly distributed 'troughs' which can be arranged at a spacing relative to each other which is a multiple greater than the depth of the 'troughs'. In such a case, the depth of the 'trough' is to be related to the width of the 'trough' in order correctly to describe the geometry of the 'trough', by specifying the depth-to-width ratio.

It is also possible for the effective thickness of the metallic layer to be adjusted by means of the depth-to-width ratio.

Figure 2A:
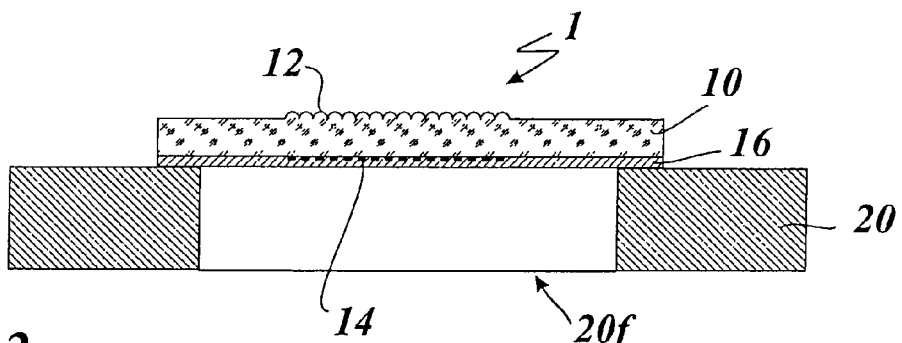
FIG. 2a shows a diagrammatic sectional view of a first arrangement by way of example of the multi-layer body in FIG. 1.
Figure 2B:
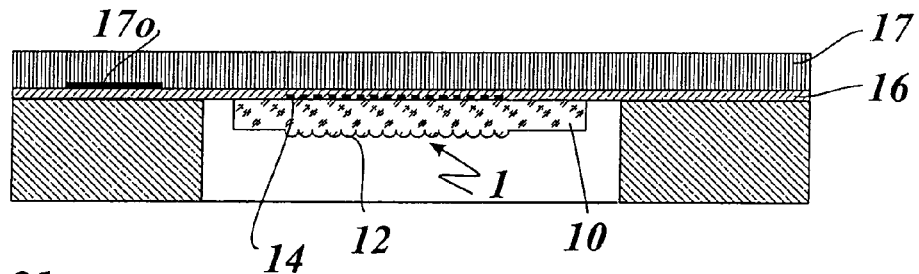
FIG. 2b shows a diagrammatic sectional view of a second arrangement by way of example of the multi-layer body in FIG. 1.
Figure 2C:
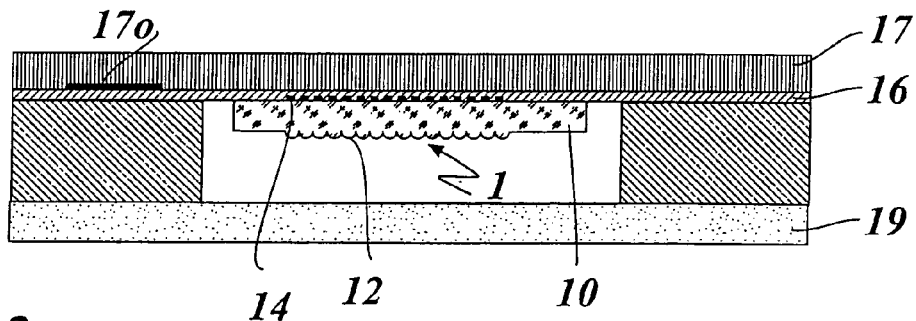
FIG. 2c shows a diagrammatic sectional view of a third arrangement by way of example of the multi-layer body in FIG. 1.

FIGS. 2a to 2c now show examples of the arrangement of the multi-layer body 1 on a carrier 20 which is provided with a window 20f and which can be for example a window banknote.

FIG. 2a shows a first arrangement by way of example, in which the multi-layer body 1 is applied to the window 20f by means of the adhesive layer 16. FIGS. 2a to 2c are diagrammatic views. It is possible for example for the carrier 20 which comprises paper to be compressed in the operation of applying the multi-layer body 1 in the region of the window 20f to such an extent that the surface of the carrier layer 10 is disposed flush with the surface of the carrier 20.

FIG. 2b shows a second arrangement by way of example in which the multi-layer body 1 is disposed in the window 20f, the micro-lenses 12 facing towards the rear side of the carrier 20. The adhesive layer 16 engages over the window 20f, the rear side of the carrier layer 10 being aligned with the front side of the carrier 20. The micro-lenses 12 of the multi-layer body 1 therefore face towards the rear side of the carrier 20. The adhesive layer 16 is covered on its rear side by a first protective layer 17, wherein, in the embodiment illustrated in FIG. 2b, provided in a region arranged beside the window 20f between the protective layer 17 and the adhesive layer 16 is an optically active layer 17o which can be for example a hologram or a KINEGRAM®.

FIG. 2c now shows a third arrangement by way of example in which the multi-layer body 1 is completely encapsulated by the rear side of the window 20f being covered over by a second protective layer 19. This can involve a thermoplastic adhesive, but it is also possible to provide an adhesive layer between the protective layer 19 and the rear side of the carrier 20. The completely encapsulated multi-layer body 1 is particularly well protected from damage and/or contamination and can therefore preferably be provided for window banknotes.

Figure 3A:
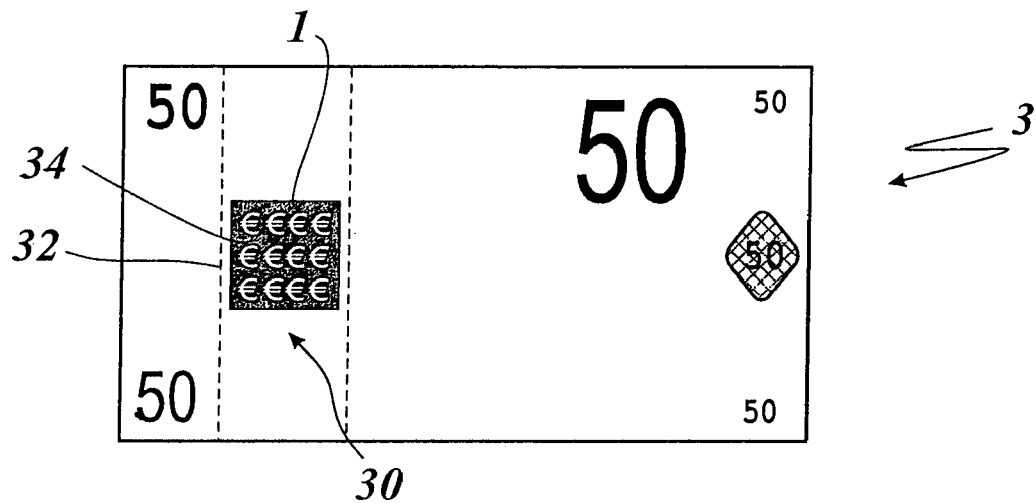
FIG. 3a shows a diagrammatic front view of a first window banknote with a multi-layer body from FIG. 1.
Figure 3B:
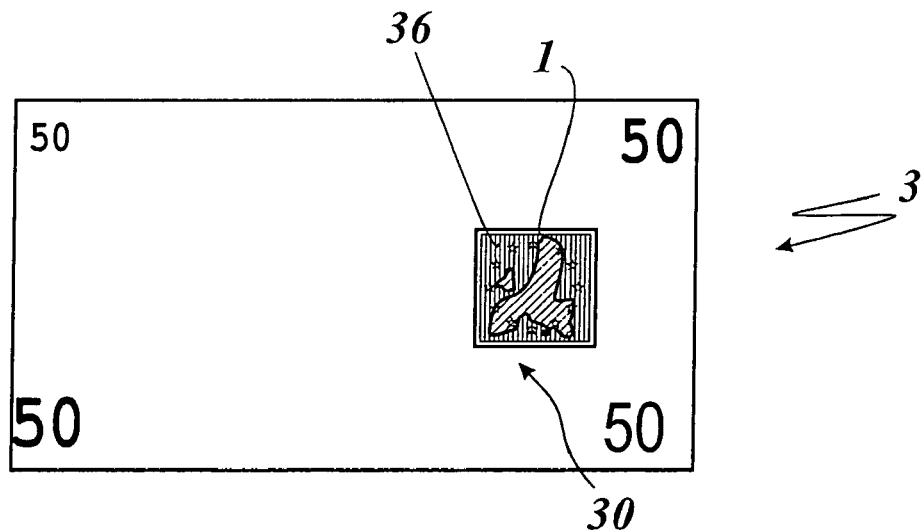
FIG. 3b shows the rear view of the window banknote of FIG. 3a, FIG. 4a shows a first variant of a micro-image layer of the multi-layer body of FIG. 1.

FIGS. 3a and 3b now show an example of use of the multi-layer body 1 of FIG. 1.

A banknote 3 has a window 30 into which the multi-layer body 1 is fitted. It can also be provided that the banknote has a plurality of windows. The multi-layer body 1 can be for example a portion of a film strip 32, the edges of which are indicated by broken lines in FIG. 3a, the film strip 32 being positioned in such a way that the multi-layer body 1 completely fills the window 30 of the banknote 3.

In the example shown in FIGS. 3a and 3b, the micro-patterns are such that a number of Euro currency symbols 34 is visible when viewing the front side of the banknote 3. The Euro currency symbols 34 appear to a viewer to float over, under or in the surface of the banknote and, upon a change in the viewing angle, change their position relative to the surface of the banknote 3. The Euro currency symbols 34 appear transparent to the eye of the viewer (FIG. 3a), an effect which is in contrast with when the window is viewed from the rear side of the banknote (FIG. 3b).

When viewing the rear side of the banknote 3 (FIG. 3b) the viewer can see in the window 30 of the banknote 3 a grey scale image 36 which can be formed from the micro-patterns 14m which cannot be resolved by the naked human eye. It can also be provided however that the pixels of the grey scale image 36 are formed from two different micro-patterns 14m which are arranged in a raster, for example in a 50%/50% raster.

From the point of view of the person viewing the banknote 3, the multi-layer body 1 disposed in the window 30 of the banknote 3 causes an interesting optical effect which can be easily remembered and which so-to-speak at first glance makes it possible to distinguish a genuine banknote from a copied banknote.

Figure 4C:
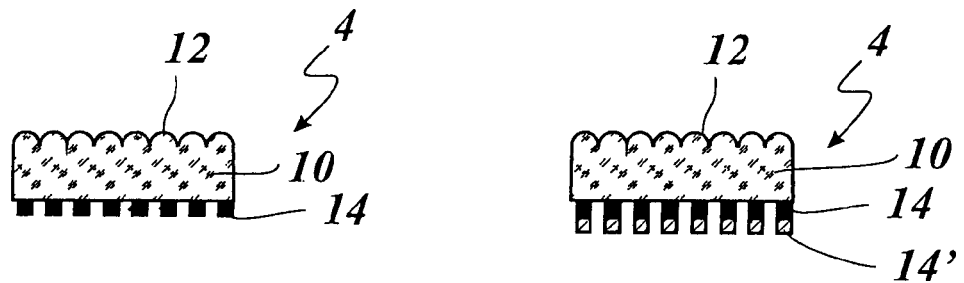
FIG. 4c shows a third variant of a micro-image layer of the multi-layer body of FIG. 1.
Figure 4C:
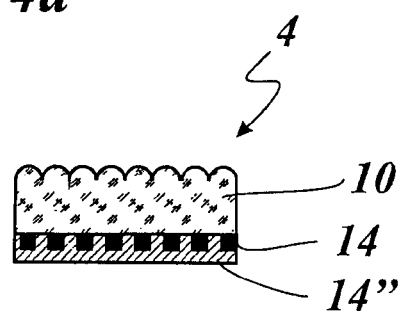

FIGS. 4a to 4c now show variants of the metallic layer 14 which is in the form of a micro-image layer.

FIG. 4a shows a multi-layer body 4 which is formed from the carrier layer 10 which has the micro-lenses 12 on its front side and the metallic layer 14 which is applied to the rear side of the carrier layer 10. The layer 14 can be made for example from gold. Both the micro-patterns which are visible from the front side and also the grey scale image which is visible from the rear side appear to be of a gold colour.

FIG. 4b now shows a multi-layer body 4' in which a further metallic layer 14' is applied to the metallic layer 14, with both layers being structured in the same way. In that fashion, each region of a micro-pattern is formed from two layers 14 and 14' which are arranged one over the other. The second layer can be for example silver. The micro-patterns which are visible from the front side appear in a golden surrounding area while the grey scale image which is visible from the rear side appears silver.

FIG. 4c shows a multi-layer body 4" in which the layer 14 is covered with a layer 14" which also fills the regions in which the layer 14 is partially removed. The layer 14" can be a metallic layer, but it can also be provided that the layer 14" is in the form of a coloured layer and is applied by printing. It can also be provided that the layer 14" is in the form of a layer that is transparent in a spectral range, so that further interesting optical effects can be achieved.

Figure 5:
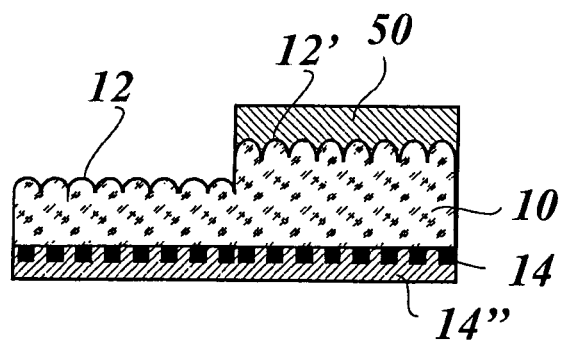
FIG. 5 shows a diagrammatic sectional view of a second embodiment of the multi-layer body according to the invention.

FIG. 5 now shows a multi-layer body 5 which is made up like the multi-layer body 4", but in which a portion of the carrier layer 10 is covered over with a protective layer 50. In that portion the carrier layer 14" has micro-lenses which can differ in their focal length from the micro-lenses 12. The protective layer 50 and the carrier layer 10 differ in their refractive indices so that the action of the micro-lenses 12 is retained. It is to be noted however that, in the portion which is covered over by the protective layer, the thickness of the carrier layer must be so adapted that the layer 14 is again arranged in the focal plane of the micro-lenses 12'.

Figure 6A:
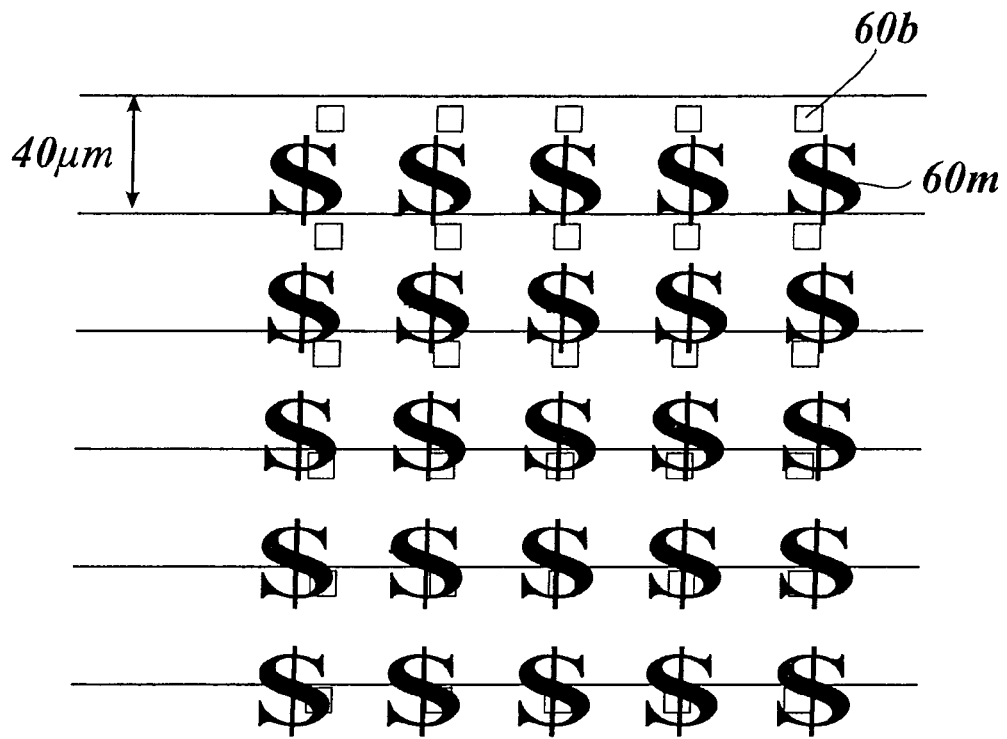
FIGS. 6a to 6c show views to illustrate the operating principle of the multi-layer body of FIG. 1.
Figure 6B:
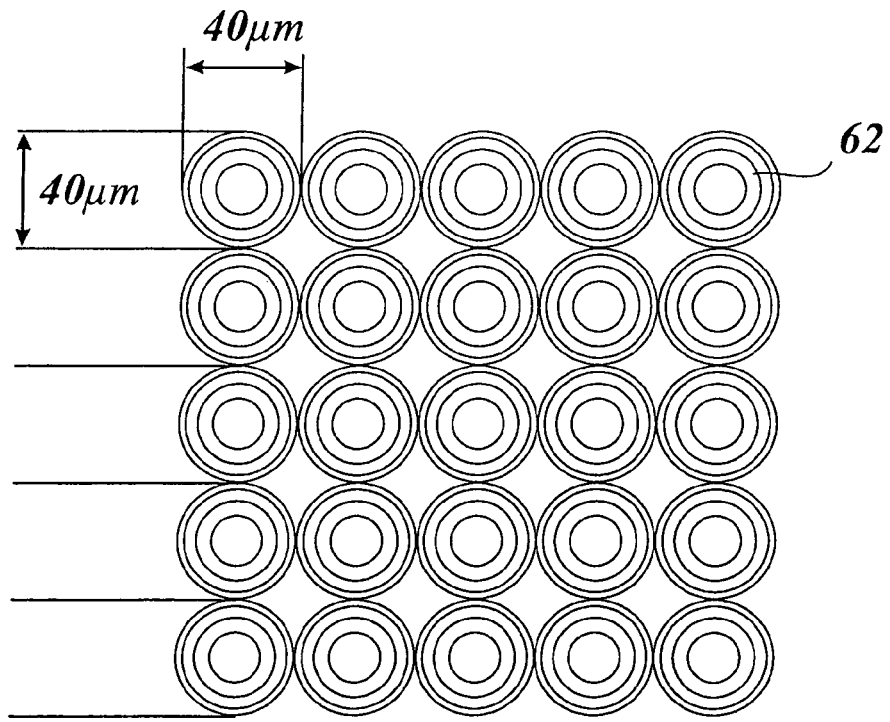
Figure 6C:
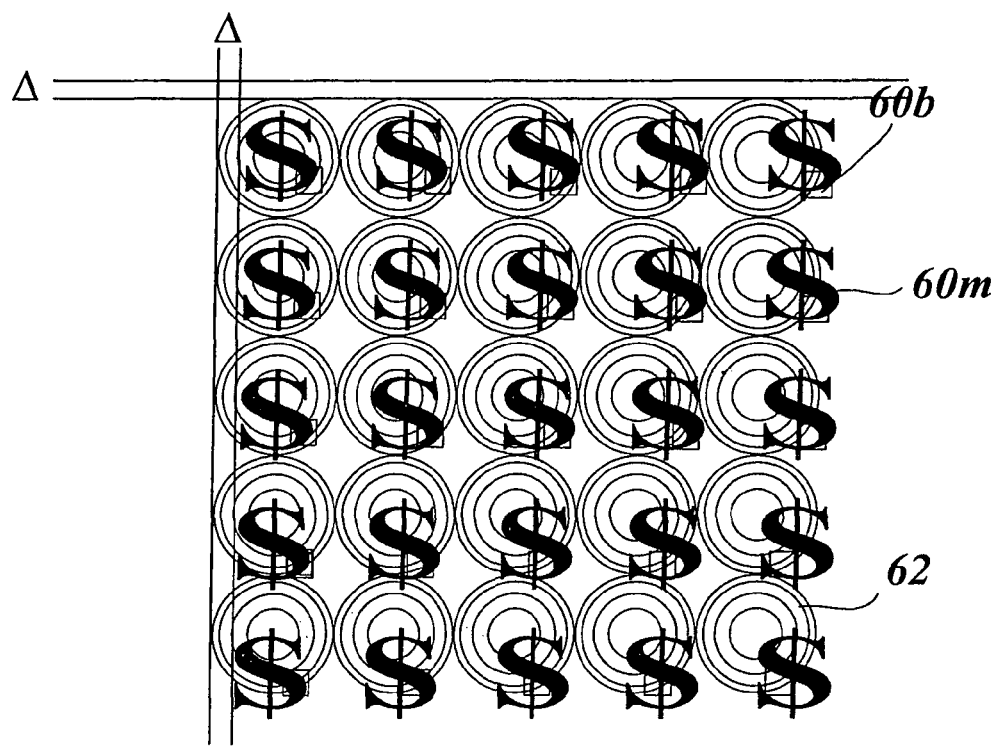

FIGS. 6a to 6c show the action of the individual layers of a multi-layer body 6 according to the invention.

FIG. 6a shows micro-patterns 60m which are arranged in a square raster of a raster width of 40 μm. The micro-patterns 60m have a pictorial or image representation in the form of a transparent dollar symbol which is shown in blackened form for the sake of greater ease of illustration in FIGS. 6a and 6c. Image regions 60b affected by micro-lenses 62 in FIG. 6b are arranged in such a way that they contain respectively different regions of the micro-patterns 60m.

The micro-lenses 62 shown in FIG. 6b are arranged in a square raster of the raster width 40 μm. As can be seen from FIG. 6c the two rasters are displaced relative to each other by an amount Δ. Different optical effects can be generated in dependence on whether the micro-pattern raster is greater than the micro-lens raster (Δ>0) or the micro-pattern raster is smaller than the micro-lens raster (Δ<0). It is however also possible for Δ=0, but for the two rasters to be turned relative to each other.

In addition the alignment of the micro-patterns can be different. The micro-patterns can involve the same orientation as the enlarged images, that is to say they can be aligned in parallel relationship therewith; they can be aligned in upside-down relationship, that is to say in anti-parallel relationship with each other, and they can be arranged at an angle relative to each other, with an angle of about 90° being preferred.

Figure 7:
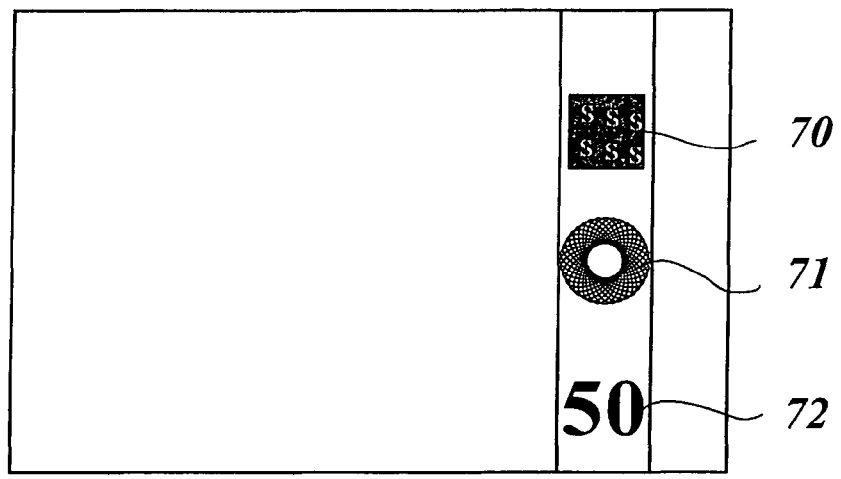
FIG. 7 shows a front view of a second window banknote with a micro-image layer of FIGS. 6a to 6c.

FIG. 7 shows the front view of a second window banknote 7, with the multi-layer body 6 of FIGS. 6a to 6c being arranged in the window 70 of the banknote 7. The window banknote 7 further has a KINEGRAM® (71) and an embossed declaration of value (72).

Figure 8:
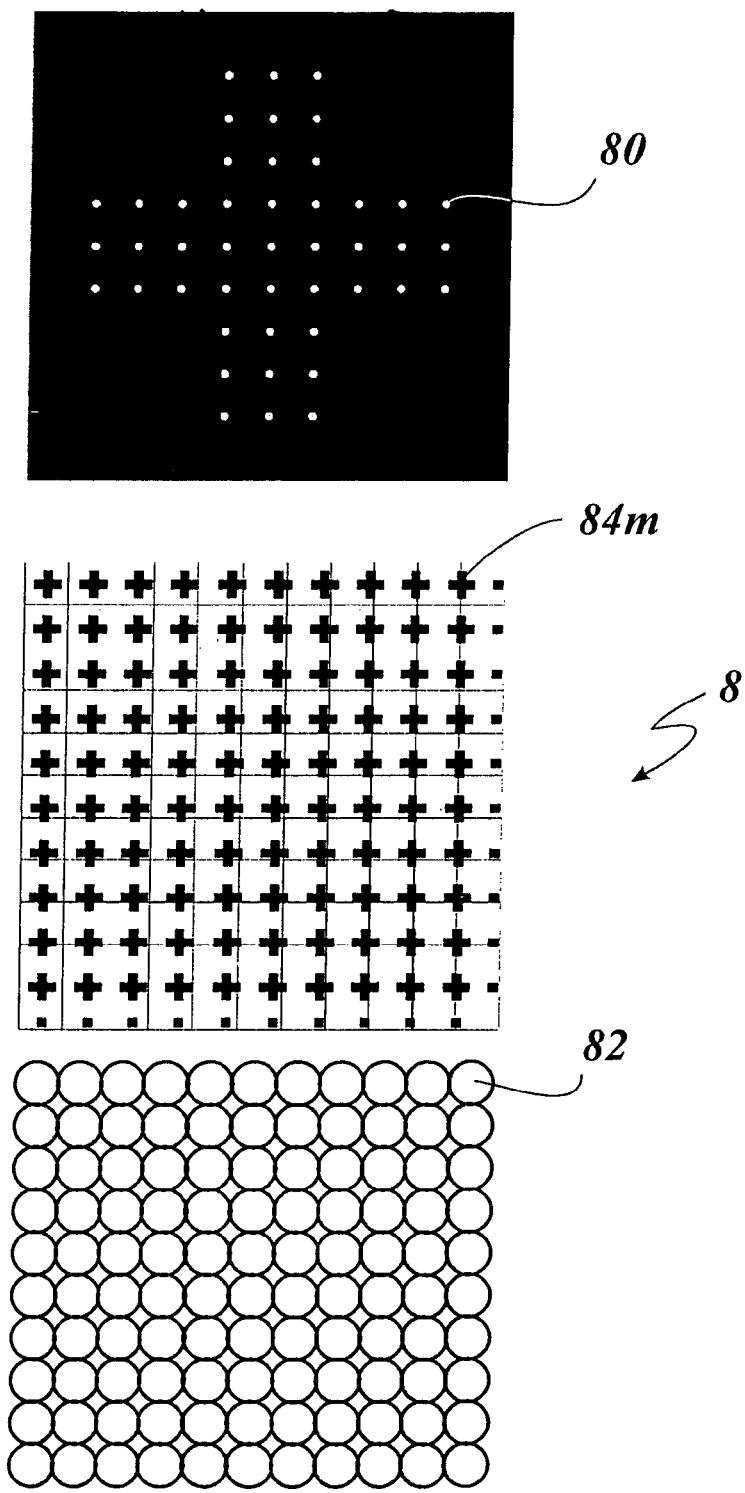
FIG. 8 shows a diagrammatic view of a third embodiment of the multi-layer body according to the invention.

FIG. 8 shows layers of a multi-layer body 8 in which micro-holes 80 form a pattern which is congruent with micro-patterns 84m. A greater depth of focus is admittedly achieved with the imaging of the micro-patterns 84m, but the light intensity of the imaging decreases. Therefore the arrangement has a layer with micro-lenses 82 which focus the light which is incident through the micro-holes 80. The micro-lenses 82 and the micro-holes 80 are arranged in 1:1 relationship with each other and are disposed exactly in register relationship with each other. In the illustrated embodiment the micro-holes 80 form a 'Swiss cross' of the dimensions 10 mm×10 mm. The micro-lens array is provided with the same dimensions of 10 mm×10 mm. The effect of the micro-hole array is that it is seen exactly when the light focussed by the micro-lenses is projected through the micro-holes 80 into the field of vision.

It is possible for micro-hole arrays which are illuminated through the micro-lens array for example with laser light at two angles to be arranged in mutually juxtaposed relationship in register relationship. In that way a three-dimensional image of an object can be very easily produced by a complex of micro-hole arrays.

Figure 9:
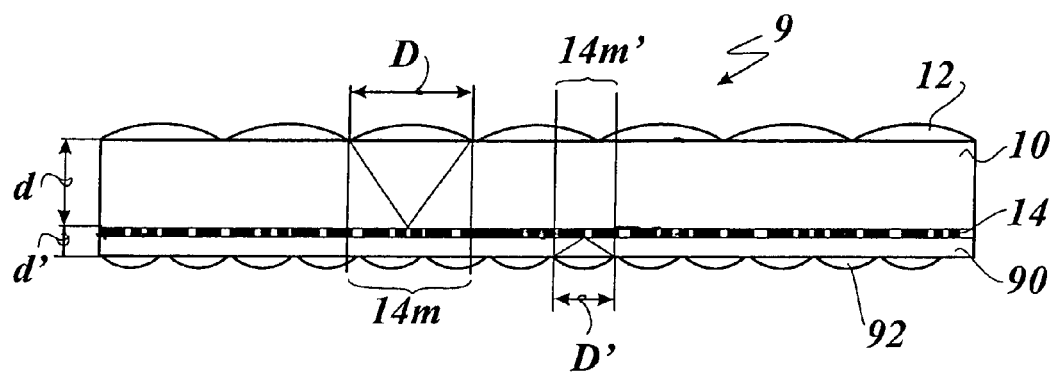
FIG. 9 shows a diagrammatic sectional view of a fourth embodiment of the multi-layer body according to the invention.

FIG. 9 now shows a multi-layer body 9 which differs from that illustrated in FIG. 1 in that micro-lenses are also arranged on the rear side of the multi-layer body.

In the FIG. 9 embodiment, arranged on the side of the metallic layer 14, that is remote from the carrier layer 10, is a micro-lens layer 90 in which micro-lenses 92 are shaped on the outside thereof. The micro-lenses 92 are spherical or aspheric lenses which are distributed in a regular two-dimensional arrangement on the outside of the micro-lens layer 90. As can be seen from the FIG. 9 embodiment the micro-lenses 92 are arranged in densely packed relationship, that is to say adjacent micro-lenses touch each other or are at a spacing which is negligible in relation to their diameter, insofar as their diameter is large in comparison with the usual spacing of some μm. The micro-lenses 92 are of a diameter D' which is less than the diameter D of the micro-lenses 12 provided on the carrier layer 10. The focal length of the micro-lenses 92 is also less than that of the micro-lenses 12, and for that reason the thickness d' of the micro-lens layer 90 is also less than the thickness of the carrier layer 10.

By virtue of the different parameters of the micro-lenses 12 and 92, in particular the focal length and the diameter, a different visual impression is produced by the carrier layer 10 and the micro-lens layer 90 respectively. A viewer now sees images which appear transparent and which are magnified to different extents, of different regions of the metallic layer 14, which seem to float at differing heights above the multi-layer body and which change their position upon a change in the viewing angle. That effect is produced not directly by the focal lengths of the micro-lenses but by the different raster widths of the micro-images and micro-lenses. In the embodiment shown in FIG. 9, this involves different micro-patterns 14m and 14m' which are respectively associated with the micro-lenses 12 and 92 respectively. The micro-patterns 14m and 14m' are arranged in a 50%/50% raster.

Figure 10:
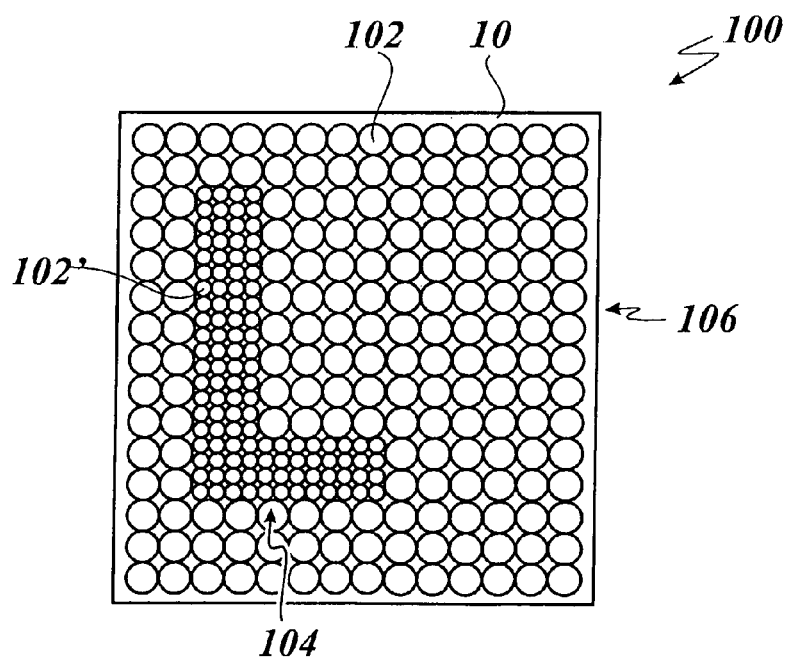
FIG. 10 shows a diagrammatic plan view of a fifth embodiment of a multi-layer body according to the invention.

FIG. 10 shows a plan view of a multi-layer body 100 whose layer structure corresponds to that of the multi-layer body 1 of FIG. 1. Micro-lenses 102 and 102' of differing diameters are shaped in the outer surface of the carrier layer 10. The micro-lenses 102' are of a smaller diameter than the micro-lenses 102. In the illustrated embodiment the diameter of the micro-lenses 102 is twice as great as the diameter of the micro-lenses 102'. The micro-lenses 102' form a connected pattern region 104 of L-shape, while the micro-lenses 102 form a rectangular background region 106.

Just by virtue of the differing configuration of the micro-lenses 102 and 102', both micro-lens regions produce a different optical impression, for example the illusion of items of image information floating at differing heights. It can also be provided that the regions are associated with differently coloured micro-patterns, in which respect the coloration can be produced by coloured pigments and/or by material coloration and/or by physical effects as are to be observed for example on thin-layer systems.

It can be provided that the micro-lenses 102 and 102' have the same focal length. In that case the thickness d of the carrier layer 10 is constant and the apexes of the micro-lenses 102' are at a lower level than those of the micro-lenses 102, wherein the micro-lenses 102 and 102' have a similar radius of curvature. The micro-lenses 102 can involve for example portions of spheres, the flat surface of which is delimited by a large circle while the micro-lenses 102' can be portions of spheres, the flat surface of which is delimited by a small circle, wherein consequently the micro-lenses 102' are of a smaller thickness than the micro-lenses 102.

It can also be provided however that the micro-lenses 102 and 102' have different radii of curvature so that the focal lengths of the two micro-lenses are different. In that case it is provided that the thickness d of the carrier layer 10 is different in the two regions referred to above, so that, both in the background region 106 which is covered by the micro-lenses 102 and also in the pattern region 104 which is covered by the micro-lenses 102', the micro-patterns which are formed in the metallic layer 14 (not shown in FIG. 10) are respectively arranged in the focal point plane of the micro-lenses 102 and 102' respectively.

In the embodiment illustrated in FIG. 10 the L-shaped region formed by the micro-lenses 102' can also be detected by tactile feel. Such a property makes imitation considerably more difficult and in addition permits authenticity checking for visually impaired people.

FIGS. 11a and 11b now show a multi-layer body 110 which is substantially like the multi-layer body 1 shown hereinbefore in FIG. 1, but in this case, instead of the metallic layer 14 which is removed in region-wise manner, the multi-layer body 110 has a metallic layer 114 provided with micro-holes 114l. The micro-holes 114l are arranged at the focal point of the micro-lenses 12. The multi-layer body 110 is illuminated in FIG. 11a from the front side by a light source 112. A viewer 111 symbolised by an eye looks on to the rear side of the multi-layer body 110. FIG. 11b shows the multi-layer body 110 when it is illuminated from the rear side; the viewer 111 is now looking on to the front side of the multi-layer body 110.

In FIG. 11a the micro-lenses 12 collect light rays incident from the front side of the multi-layer body 110, of a beam 112v which emanates from the light source 112 and which is of a diameter D', and concentrate them on the micro-holes 114l. The micro-holes 114l which are of a diameter d'<D' are apparently magnified by the beams 112r which fan out behind them, so that the totality of the micro-holes 114' gives the viewer 111 the optical impression of a lit transparent surface.

In FIG. 11b, beams 112r of the diameter d' pass from the rear side of the multi-layer body 110 through the micro-holes 114l and are of a diameter D'>d' on the front side of the multi-layer body 110, as a consequence of the optical effect of the micro-lenses 12. Due to the magnification of the beams 112r the light density thereof decreases so that the multi-layer body appears as a light-screening filter for the viewer 111 who is looking on to the front side thereof.

The multi-layer body 110 is therefore a directionally dependent filter which can be applied for example as a sight protection to window panes.

The invention claimed is:

1. A multi-layer body for viewing from the front and rear side in transillumination and/or incident illumination,
wherein the multi-layer body has one or more transparent first layers and a second layer which has a plurality of micro-patterns comprising one or more opaque first partial regions and one or more transparent second partial regions, wherein in the region of the second partial regions, the multi-layer body is transparent throughout, one of the first layers on its surface remote from the second layer has a surface profile which forms an arrangement of a plurality of first micro-lenses, wherein the micro-lenses are of a diameter of less than 50 μm and a respective pixel of the micro-pattern is selected by the micro-lenses per micro-lens, and the thickness of said first layer or said first layer and one or more further first layers arranged between said first layer and the second layer approximately corresponds to the focal length of the first micro-lenses and
wherein the micro-patterns form pixels of a grey scale image, wherein the dimensions of the pixels are <300 μm.

2. A multi-layer body according to claim 1, wherein the transparent second partial regions form an image representation and the opaque first partial regions form a background region from which the image representation stands out.

3. A multi-layer body according to claim 1, wherein the surface proportion of the opaque first partial regions in relation to the total surface area of the first and second partial regions is 20% to 60%.

4. A multi-layer body according to claim 2, wherein the image representation is a geometrical figure, one or more alpha-numeric characters or a logo.

5. A multi-layer body according to claim 1, wherein the micro-lenses and the micro-patterns have a repetitive arrangement.

6. A multi-layer body according to claim 5, wherein the micro-lenses and the micro-patterns are respectively arranged in a two-dimensional raster, wherein the raster width is 20 μm to 50 μm.

7. A multi-layer body according to claim 6, wherein the rasters of the micro-lenses and the micro-patterns coincide.

8. A multi-layer body according to claim 6, wherein the rasters of the micro-lenses and the micro-patterns are different.

9. A multi-layer body according to claim 6, wherein the raster width of the micro-lenses and/or the micro-patterns is constant.

10. A multi-layer body according to claim 6, wherein the raster width of the micro-lenses and/or the micro-patterns is variable.

11. A multi-layer body according to claim 7, wherein the rasters of the micro-lenses and the micro-patterns are displaced relative to each other.

12. A multi-layer body according to claim 5, wherein the micro-lenses and the micro-patterns are arranged in register relationship.

13. A multi-layer body according to claim 1, wherein micro-patterns have a different grey value by the opacity of the first partial regions and/or the transparency of the second partial regions being varied.

14. A multi-layer body according to claim 1, wherein the micro-patterns of the second layer are respectively formed by a transparent second partial region which is in the form of a micro-hole and by an opaque first partial region of the second layer, which completely surrounds the second partial region.

15. A multi-layer body according to claim 14, wherein the micro-lenses and the micro-holes have a repetitive arrangement.

16. A multi-layer body according to claim 15, wherein the micro-lenses and the micro-holes are respectively arranged in a two-dimensional raster.

17. A multi-layer body according to claim 16, wherein the micro-lenses and the micro-holes are arranged in register relationship, the focal points of the micro-lenses corresponding to the centre points of the micro-holes.

18. A multi-layer body according to claim 17, wherein the diameter of the micro-lens is larger than the diameter of the micro-hole.

19. A multi-layer body according to claim 18, wherein the diameter of the micro-hole is 1% to 50% of the diameter of the micro-lens.

20. A multi-layer body according to claim 1, wherein the second layer in the opaque first partial regions and in the transparent second partial regions has a surface structure with a different depth-to-width ratio.

21. A multi-layer body according to claim 1, wherein the first layers and the second layer together are of a thickness of 10 μm to 1000 μm.

22. A multi-layer body according to claim 21, wherein the first layers and the second layer together are of a thickness of 15 μm to 50 μm.

23. A multi-layer body according to claim 1, wherein the second layer, on the side remote from the first layer with the first micro-lenses, is provided with one or more transparent third layers which on the surface thereof that is remote from the second layer has a surface profile which forms an arrangement of a plurality of second micro-lenses, and the thickness of said third layer or said third layer and arranged between said third layer and the second layer one or more further third layers approximately corresponds to the focal length of the second micro-lenses.

24. A multi-layer body according to claim 23, wherein the micro-patterns respectively include first and second micro-patterns, wherein the first and second micro-patterns are arranged in partial rasters which form a raster.

25. A multi-layer body according to claim 24, wherein the raster is a 50%/50% raster.

26. A multi-layer body according to claim 1, wherein at least some of the micro-lenses are of a different colour.

27. A multi-layer body according to claim 26, wherein the micro-lenses form a coloured pattern.

28. A multi-layer body according to claim 23, wherein mutually oppositely arranged micro-lenses of the first layer and the third layer are complementarily coloured.

29. A multi-layer body according to claim 1, wherein the first layer and/or the third layer has micro-lenses of at least two different diameters.

30. A multi-layer body according to claim 29, wherein micro-lenses of the same diameter form a region.

31. A multi-layer body according to claim 30, wherein the region which is formed by the micro-lenses of the same diameter is tactily detectable.

32. A multi-layer body according to claim 29, wherein micro-lenses of different diameters have a different focal length.

33. A multi-layer body according to claim 29, wherein micro-lenses of differing diameters are of the same focal length.

34. A multi-layer body according to claim 1, wherein the micro-lenses are in the form of refractive lenses.

35. A multi-layer body according to claim 1, wherein the micro-lenses are in the form of diffractive lenses.

36. A multi-layer body according to claim 1, wherein the micro-lenses are covered with a fourth layer, wherein the difference in refractive index between the fourth layer and the layer in which the micro-lenses are shaped is >0.2.

37. A multi-layer body according to claim 36, wherein the fourth layer is a protective layer.

38. A multi-layer body according to claim 36, wherein the fourth layer is an adhesive layer.

39. A multi-layer body according to claim 1, wherein the second layer is a metallic layer.

40. A multi-layer body according to claim 1, wherein the second layer has a highly refractive dielectric layer.

41. A multi-layer body according to claim 1, wherein the second layer has a coloured pigment layer.

42. A multi-layer body according to claim 1, wherein the second layer is formed by a thin film layer system.

43. A multi-layer body according to claim 1, wherein the second layer has a coloured photoresist layer.

44. A multi-layer body according to claim 1, wherein the second layer has a coloured lacquer layer.

45. An object of value with a multi-layer body arranged in a window, in accordance with claim 1.

46. A transparent body having a multi-layer body according to claim 1.

* * * * *